(12) United States Patent
Iwase et al.

(10) Patent No.: US 6,674,045 B2
(45) Date of Patent: Jan. 6, 2004

(54) GALVANOMETER CONTROLLER AND LASER MACHINING APPARATUS

(75) Inventors: Kazuaki Iwase, Tokyo (JP); Akihiko Okano, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 10/090,780

(22) Filed: Mar. 6, 2002

(65) Prior Publication Data
US 2002/0125222 A1 Sep. 12, 2002

(30) Foreign Application Priority Data

Mar. 7, 2001 (JP) ........................................ 2001-063332

(51) Int. Cl.[7] .............................................. B23K 26/00
(52) U.S. Cl. .................................................... 219/121.8
(58) Field of Search ........................ 219/121.67, 121.68, 219/121.69, 121.72, 121.8, 121.81; 359/202

(56) References Cited

U.S. PATENT DOCUMENTS

| | | | | |
|---|---|---|---|---|
| 5,187,364 A | * | 2/1993 | Blais | |
| 5,646,765 A | * | 7/1997 | Laakmann et al. | |
| 6,483,071 B1 | * | 11/2002 | Hunter et al. | |

* cited by examiner

*Primary Examiner*—Samuel M. Heinrich
(74) *Attorney, Agent, or Firm*—McGinn & Gibb, PLLC

(57) ABSTRACT

A galvanometer controller capable of control with stability and with immunity to changes with time and variation in environment temperature and having improved operability and expandability, and a laser machining apparatus having the galvanometer controller. The galvanometer controller comprises a correcting arrangement formed in a digital circuit, the correcting arrangement having a distortion correction section for correcting a working distortion of an optical unit including a lens, an orthogonality correction section for correcting the orthogonality between the two axes of the galvanometer, and a linearity correction section for correcting the linearity on each of the two axes.

7 Claims, 12 Drawing Sheets

COMMAND FIGURE

BARREL DISTORTION

STAR DISTORTION

INPUT

OUTPUT

GALVANOMETER CONTROLLER AND LASER MACHINING APPARATUS

BACKGROUND OF THE INVENTION

1. Field of the Invention

The present invention relates to a galvanometer controller for controlling a galvanometer which performs scanning with a laser beam at high speed and with high accuracy, and to a laser machining apparatus having the galvanometer controller.

2. Description of the Prior Art

Laser machining apparatuses have been used to perform boring, cutting, welding, marking, trimming, etc., on workpieces. Also, for machining, methods of scanning a laser beam on a workpiece in two-dimension are generally used. In one method, the laser beam is scanned by using a galvanometer or a polygon mirror, and in the other method, scanning is alternatively performed by moving an X–Y table on which a workpiece is mounted.

The X–Y table scanning method has problem of difficulty in performing high-speed driving, problem of slow response, and problem of the overall size of an apparatus being increased. In contrast, the galvanometer scanning method using a galvanometer which performs rotational drive along each of X- and Y-directions has the advantages of enabling high-speed scanning, ensuring high accuracy, and enabling an apparatus including the scanner to be simplified in construction and reduced in size.

A laser machining apparatus using a galvanometer performs machining in such a manner that rotational operations of the galvanometer having two axes along X- and Y-directions are controlled by a rotational drive unit, and a workpiece is irradiated with a beam of laser light reflected by mirrors and condensed by an optical unit such as a condenser lens and is worked by being molten and evaporated by the energy of the laser beam, as shown in FIG. 1 This type of laser machining apparatus has a high resolution on the order of microradians and a wide scanning angle, is capable of high-speed operation, and is particularly suitable for use in the field of working for accurately forming fine holes of a size on the order of microns.

The galvanometer in the laser machining apparatus has a position sensor such as a capacitance sensor for detecting the position of each the mirror. The galvanometer is accurately driven at a high speed by feedback control using a sensed position signal from the capacitance sensor.

However, the conventional controller for controlling the galvanometer used to perform scanning with a laser beam in laser machining apparatuses is conventionally constituted by analog circuitry elements and therefore has problems described below.

First, during use of the galvanometer after the time when the galvanometer is initially adjusted, the adjusted state is changed due to changes with time in analog devices constituting the analog circuit. That is, generally speaking, devices constituting a circuit change with time, and changes with time in the devices are inherently added on a processed signal. For this reason, an error occurs in galvanometer position control.

Second, a change in the adjusted state of the galvanometer is caused by characteristic changes of analog devices constituting the circuit according to environment temperature change. That is, in a case where temperature of an environment in which the laser machining apparatus is installed may vary largely, a considerable change occurs in the characteristic of the control circuit and therefore frequent galvanometer position adjustment is inherently required according to changes in environment temperature.

Third, in general, an analog circuit has many adjustment points such as variable resistor adjustments and an increased number of process steps and, therefore, a skilled person for fine adjustments is also required. Accordingly, in the adjustment based on the usage of the analog circuit, a complicated adjustment procedure is required and it becomes difficult for persons other than those experienced in handling the apparatus to perform adjustment operations.

Fourth, it is difficult to quantitatively grasp the adjusted state of the galvanometer because the galvanometer is adjusted through setting of variable analog circuitry elements, and the desired control quality cannot be obtained with stability. That is, in the analog adjustment, experience and intuition which a skilled operator has are important factors, and the adjustment varies with operators, so that the apparatus cannot always be operated in the same condition.

Fifth, in a case where a new function is required to the galvanometer controller, the controller hardware itself must be changed since the controller is constituted by the analog circuit. Accordingly, it is difficult to expand or add functions in the controller using the analog circuit elements.

Sixth, in general, characteristics of a galvanometer varies according to temperature change and humidity change. Thus, even if a circuitry characteristic of a galvanometer controller is kept constant under the condition of temperature change, characteristics of a galvanometer itself inherently varies according to the temperature change and humidity change, thereby causing erroneous operation.

SUMMARY OF THE INVENTION

In view of the above-described problems, an object of the present invention is to provide a galvanometer controller capable of controlling a galvanometer with stability and with immunity to changes with time and variation in environment temperature and having improved operability and expandability.

Another object of the present invention is to provide a laser machining apparatus having the galvanometer controller mentioned above.

To achieve the above-described object, according to the present invention, there is provided a galvanometer controller which controls the direction of laser scanning performed by a galvanometer on each of two axes, the galvanometer controller comprising a correcting arrangement formed in a digital circuit, further, the correcting arrangement having a distortion correction section for correcting a working distortion of an optical unit including a lens, an orthogonality correction section for correcting the orthogonality between the two axes of the galvanometer, and a linearity correction section for correcting the linearity on each of the two axes. Further, it is preferred that the galvanometer controller includes a temperature/humidity detector and characteristic controlling means for controlling a characteristic thereof according to the temperature change or humidity change.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Figure 1:
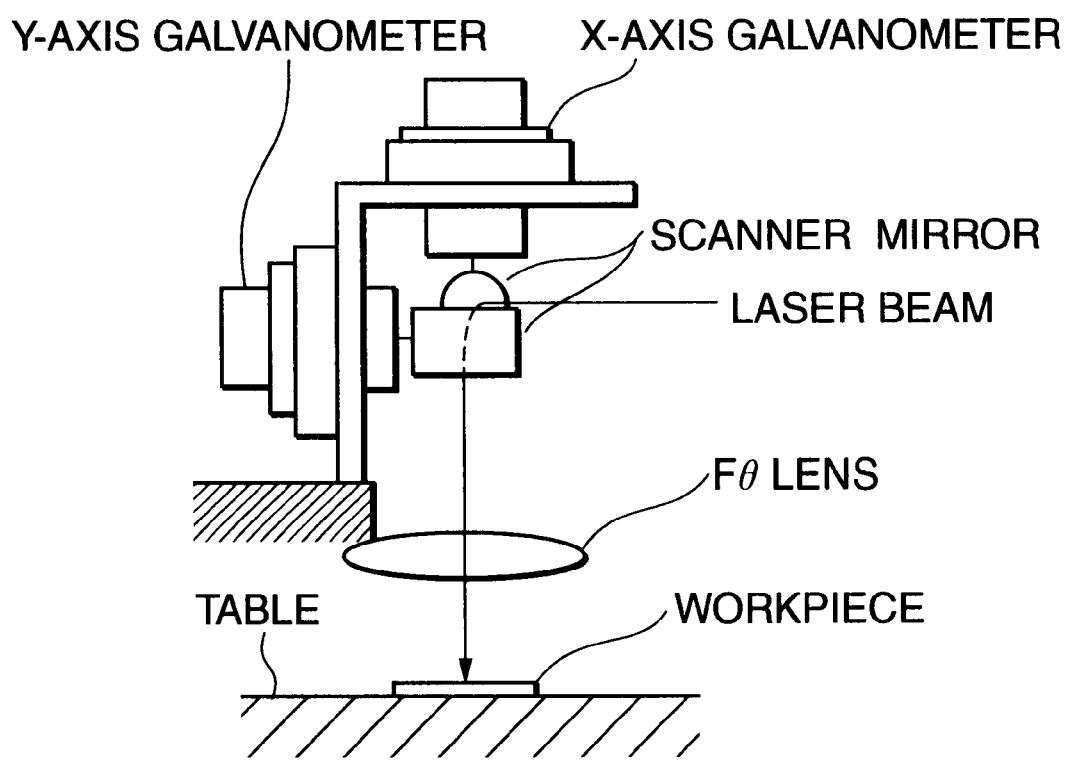
FIG. 1 is a diagram schematically showing a machining apparatus using galvanometers to which the present invention is applied.
Figure 2:
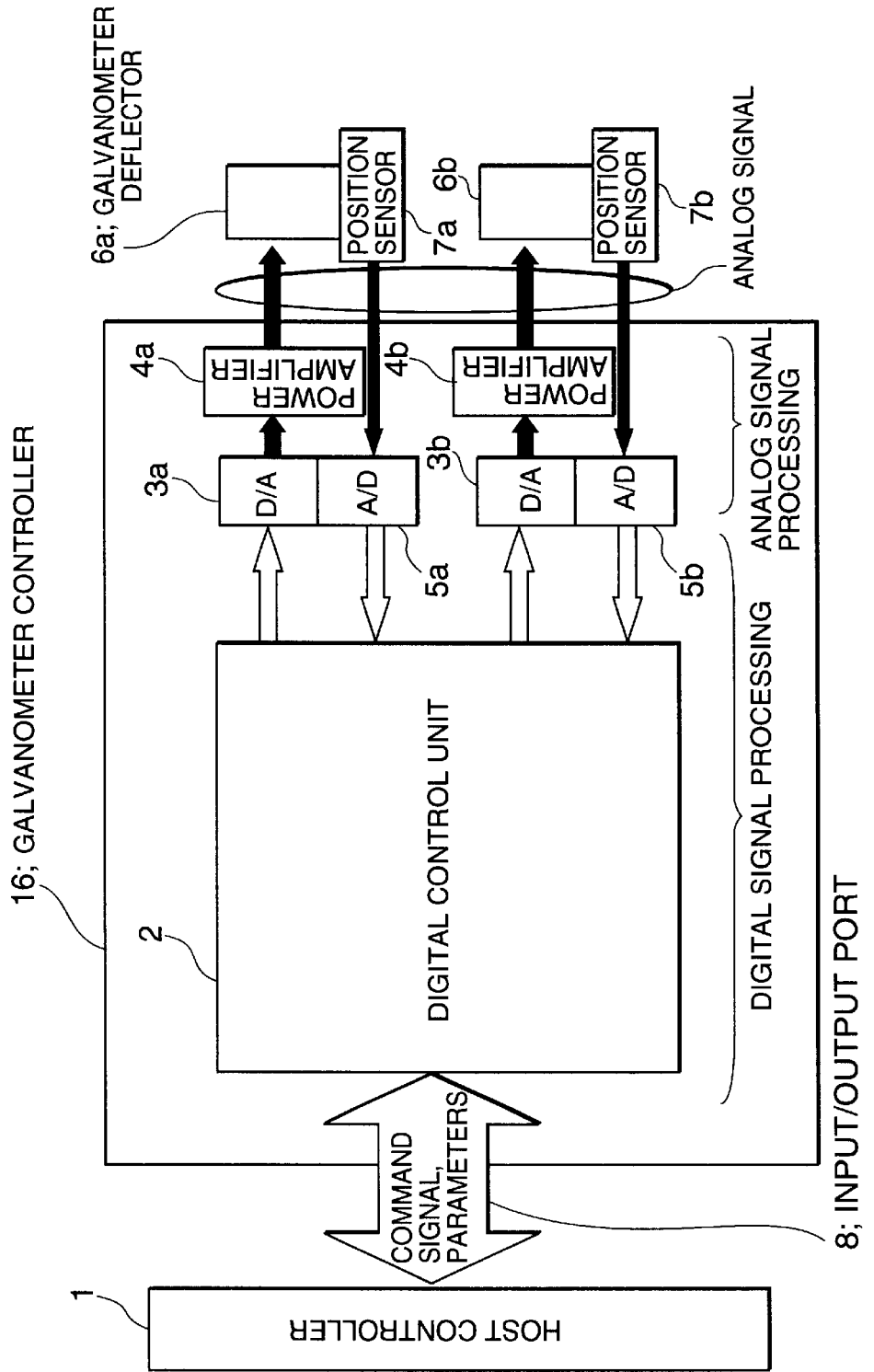
FIG. 2 is a diagram schematically showing the configuration of a galvanometer controller according to a first embodiment of the present invention.
Figure 3:
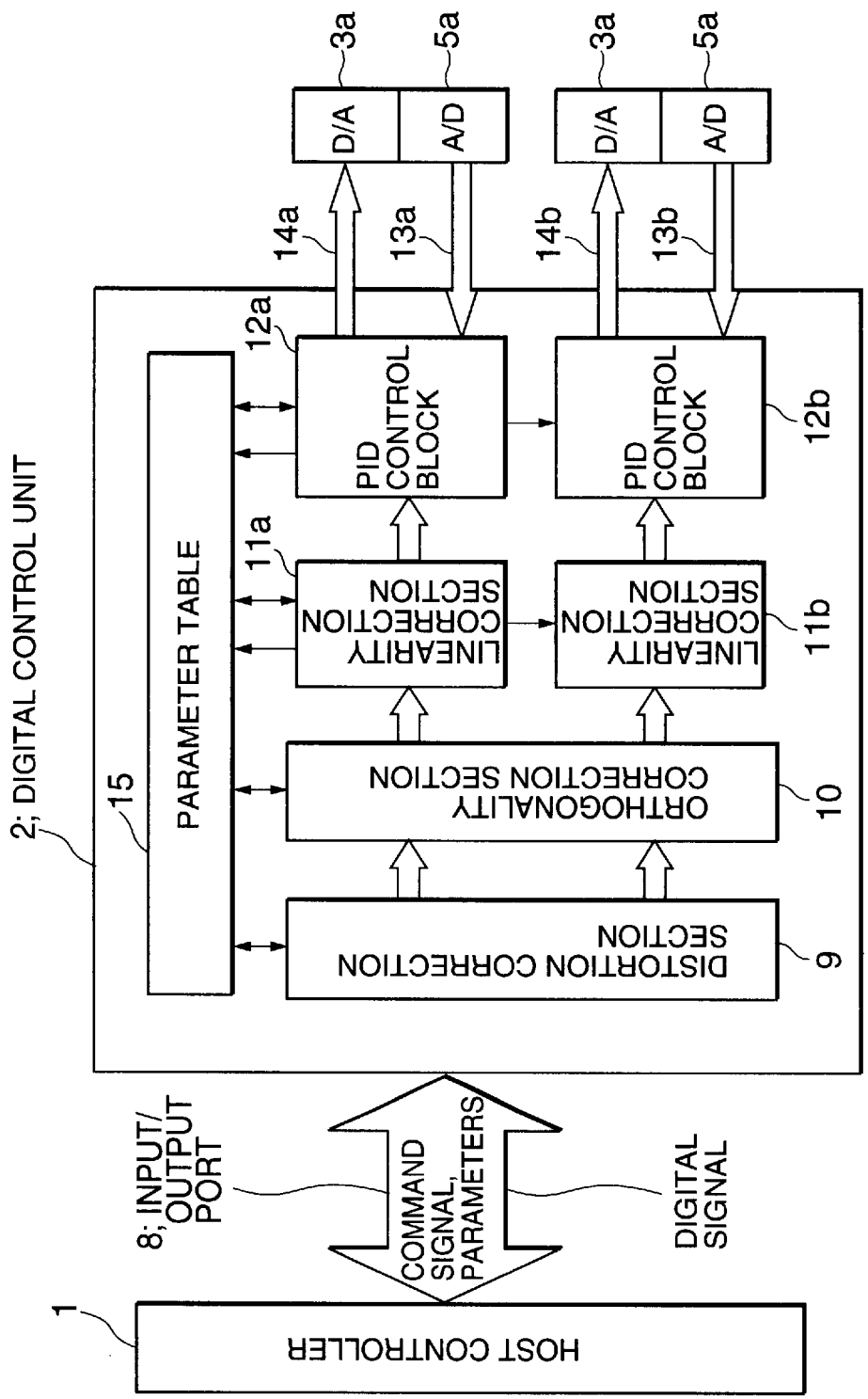
FIG. 3 is a block diagram of the galvanometer control unit shown in FIG. 2.

A galvanometer controller and a laser machining apparatus using the galvanometer controller will be described with reference to FIGS. 1, 2 and 3. The laser machining apparatus of FIG. 1 comprises a galvanometer optical unit having an X-axis galvanometer, a Y-axis galvanometer, scanner mirrors, and a fθ lens. In FIG. 1, the laser beam is deflected for scanning by the scanner mirrors attached to the X-axis and Y-axis galvanometers and is condensed by the fθ lens on a workpiece. FIG. 2 is a diagram schematically showing the configuration of the galvanometer controller according to the first embodiment of the present invention, and FIG. 3 shows a detail of a part in FIG. 2. In FIG. 2, the laser machining apparatus has a laser beam source (not shown), galvanometer deflectors 6a and 6b which respectively reflect, along X- and Y-axes, the laser beam, position sensors 7a and 7b which respectively detect the positions of the galvanometer deflectors, a galvanometer controller 16 which controls the galvanometer deflectors by referring to the sensed signals from the position sensors, the optical unit which condenses on the workpiece the laser beam reflected by the galvanometer deflectors, and a host controller 1 which controls the galvanometer controller.

As shown in FIG. 2, the galvanometer controller 16 is constituted by an input/output port 8 through which a digital position command signal is input from the host controller 1, a digital control unit 2 which performs digital signal processing, D/A converters 3a and 3b which convert galvanometer control outputs from the digital control unit 2 into analog signals, power amplifiers 4a and 4b which amplify outputs from the D/A converters 3a and 3b and drive the galvanometer deflectors 6a and 6b, and A/D converters 5a and 5b which are supplied with output signals from the position sensors 7a and 7b provided on the galvanometer deflectors with the X- and Y-axes, and which convert these analog signals into digital signals.

The operation of the thus-constructed galvanometer controller 16 will be described below. The position command and parameters supplied from the host controller 1 are input to the digital control unit 2. The sensed signals in analog form from the position sensors 7a and 7b on the galvanometer deflectors 6a and 6b are converted into digital signals by the A/D converters 5a and 5b. The converted digital signals are input to the digital control unit 2. On the other hand, digital signals for control of the galvanometer deflectors 6a and 6b are output from the digital control unit 2 and are converted into analog signals by the D/A converters 3a and 3b. The power amplifiers 4a and 4b amplify the converted analog signals and respectively drive the galvanometer deflectors 6a and 6b by the amplified signals. The optical unit scans a surface of the workpiece mounted on a table with laser beam reflected by the galvanometer deflectors 6a and 6b to perform any of various kinds of working such as marking, trimming, boring and welding.

Referring to FIG. 3, in the digital control unit 2 featuring the present invention, correction processing of various kinds is performed by a distortion correction section 9, an orthogonality correction section 10, and linearity correction sections 11a and 11b while position command data from the host controller 1 through the input/output port 8 are input. The distortion correction section 9 corrects a working distortion which occurs when a working lens having optical distortion is used. The orthogonality correction section 10 corrects the orthogonality error between the two axes of the galvanometer deflectors 6a and 6b. Each of the linearity correction sections 11a and 11b corrects the linearity error on the corresponding axis. Blocks 12a and 12b of the next stage are proportional, integral and differential (PID) control blocks and well known in the technical field, in which PID control processing is performed by using the feedback sensed position signals 13a and 13b representing the positions of the galvanometer deflectors 6a and 6b. The results of this processing are output as output signals 14a and 14b for control of the galvanometer deflectors 16a and 6b. Parameters for each correction processing and the control processing may be rewritten in a parameter table 15 by being supplied from the host controller 1 through the input/output port 8.

Figure 4:
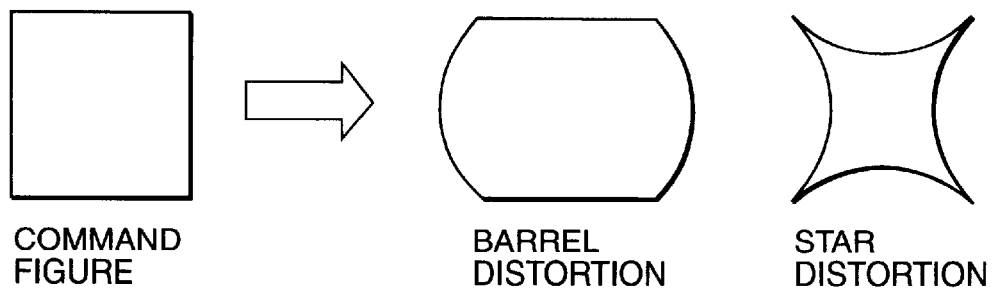
FIG. 4 shows a set of charts for explaining distortion caused by an optical unit.
Figure 5:
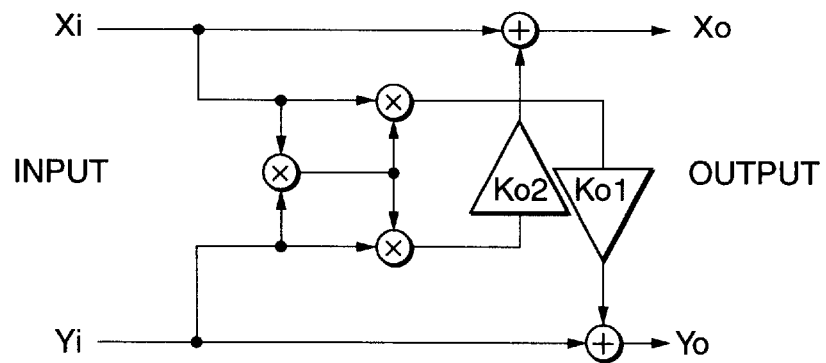
FIG. 5 shows an arithmetic circuit for correcting the distortion shown in FIG. 4.

The correction in the distortion correction section 9 will be described, In the optical unit using the galvanometers, barrel and star distortions such as shown in FIG. 4 are caused at the working plane due to distortions of the optical unit including the fθ lens and the scanner mirrors. To correct the barrel and star distortions, correction processing is performed by a digital arithmetic circuit shown in FIG. 5. Data after the distortion correction are expressed by Xo and Yo.

$Xo=(1+Ko2\ Yi^2)Xi$ $Yo=(1+Ko1\ Xi^2)Yi$

Where; Xi and Yi are X-axis and Y-axis command data, respectively.

Figure 6:
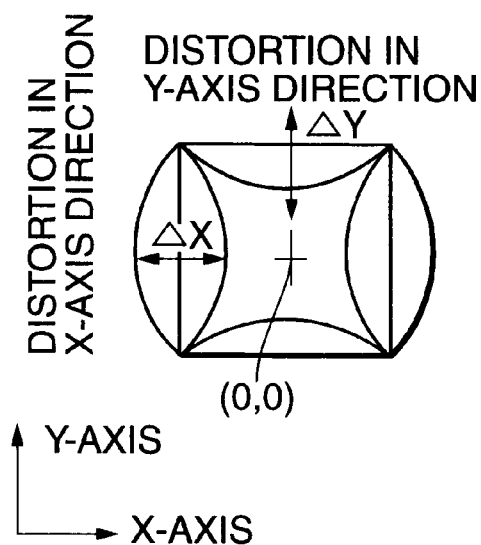
FIG. 6 schematically shows a process to determine coefficients applied to the arithmetic circuit shown in FIG. 5.

From these equations, a distortion in the X-axis direction can be corrected by a gain coefficient Ko2 expressed by a second-order function on the Y-axis. Also, a distortion in the Y-axis direction can be corrected by a gain coefficient Ko1. As shown in FIG. 6, to seek the coefficients Ko1 and Ko2, the following equations are used after actual distortions (errors) ΔX and ΔY in the X-axis and Y-axis are detected while the command data of square figure shown in FIG. 4 are applied.

$$Ko1=\Delta Y/(Yi\,Xi^2)$$

$$Ko2=\Delta X/(Xi\,Yi^2)$$

Figure 7:
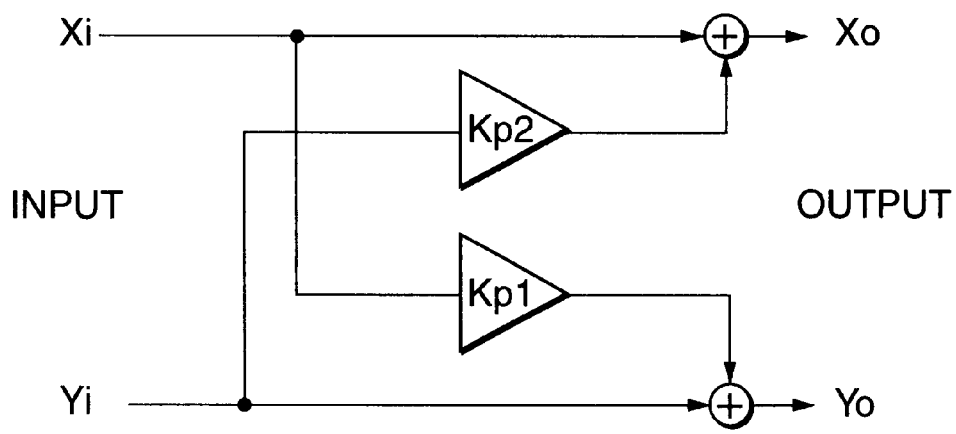
FIG. 7 shows an arithmetic circuit for correcting a orthogonal error according to the present invention.

Next, orthogonal error correction performed in the orthogonality correction section 10 will be described. There are errors of orthogonality with respect to the X- and Y-axes depending on attachment of the X-axis and Y-axis galvanometers, inclination of the scanner mirrors, etc. To correct the orthogonality error, a digital arithmetic circuit shown in FIG. 7 is applied. Data after orthogonality correction are expressed by Xo and Yo.

$$Xo=(1+Kp2\,Yi)Xi$$

$$Yo=(1+Kp1\,Xi)Yi$$

Figure 8:
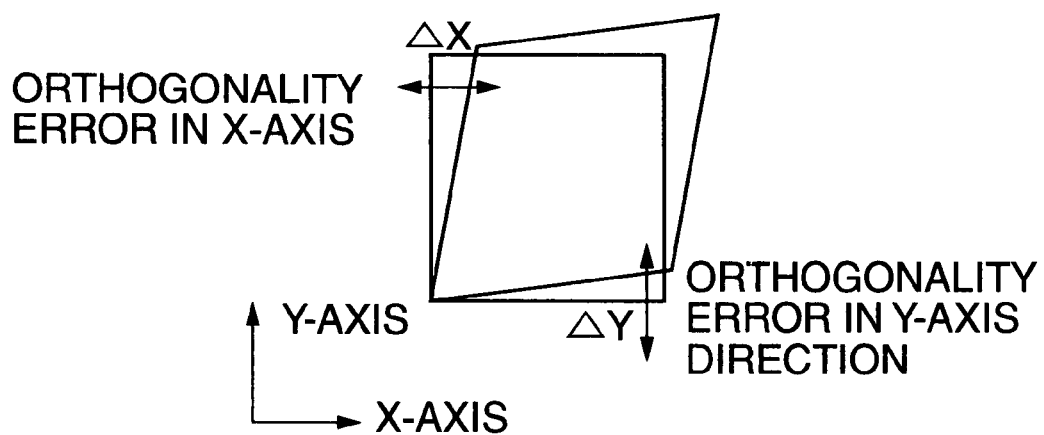
FIG. 8 schematically shows a process to determine coefficients applied to the arithmetic circuit shown in FIG. 7.

Where; Xi is X-axis command data and Yi is Y-axis command data From these equations, the orthogonal error in the X-axis direction is corrected by an inclination coefficient Kp2 expressed by a linear function on the Y-axis. Also, the orthogonal error in the Y-axis direction is corrected by Kp1. As shown in FIG. 8, to seek the coefficients Kp1 and Kp2, the following equations are used after actual distortions (errors) ΔX and ΔY in the X-axis and Y-axis are detected while the square command data shown in FIG. 8 are inputted.

$$Kp1=\Delta Y/Xi$$

$$Kp2=\Delta X/Yi$$

Figure 9:
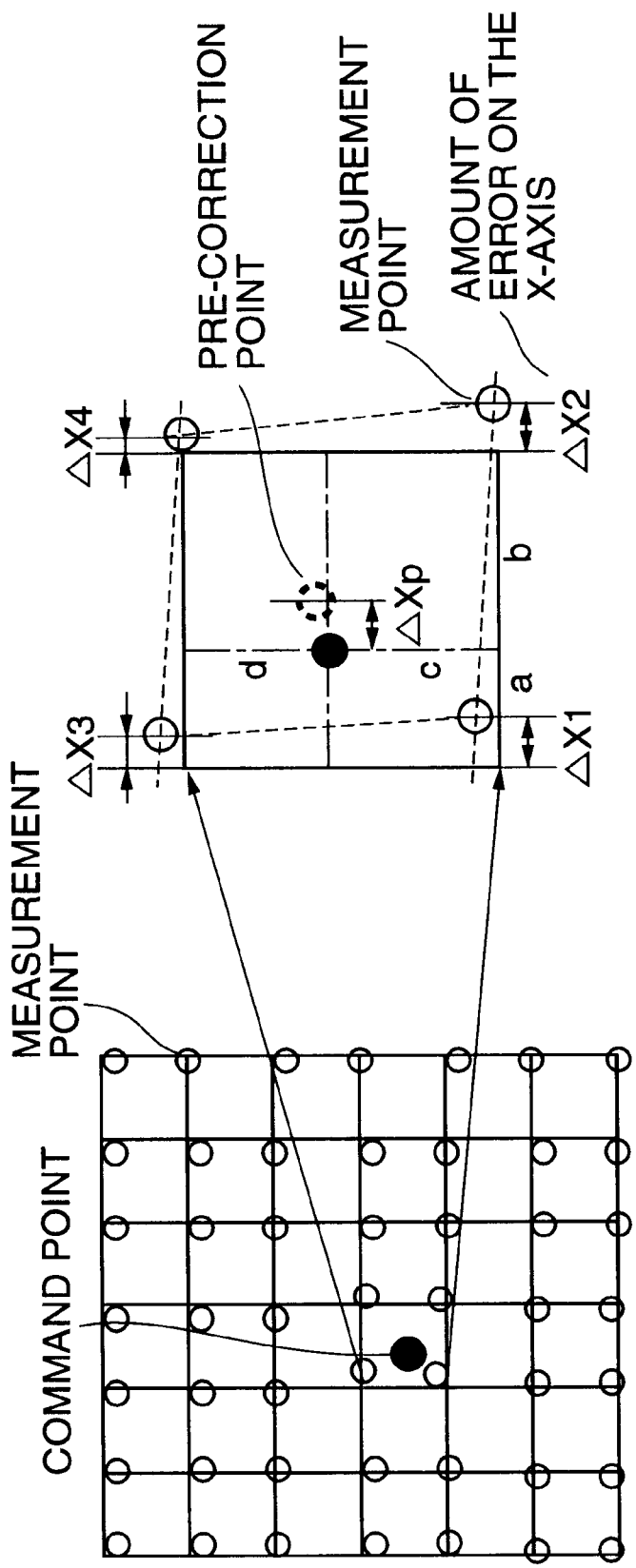
FIG. 9 shows a set of charts for schematically explaining linearity correction according to the present invention.
Figure 10:
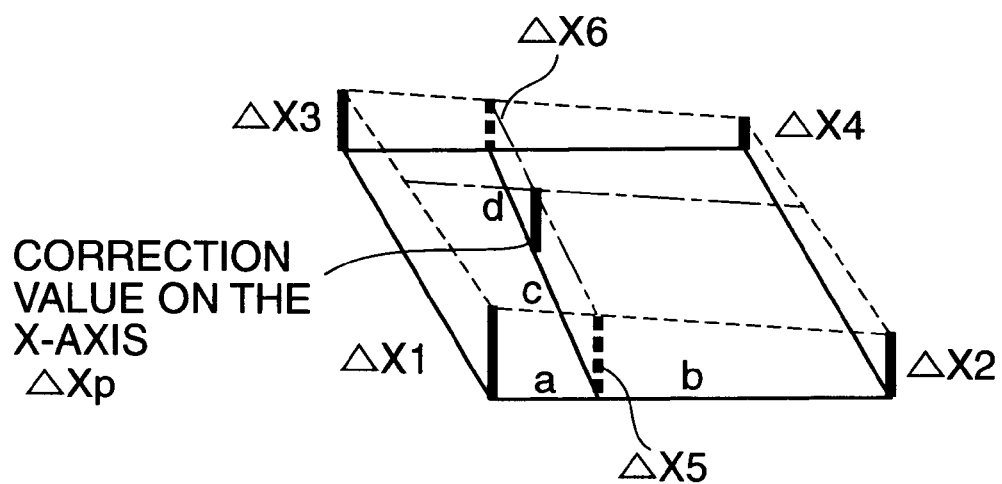
FIG. 10 is another chart for schematically explaining the linearity according to the present invention.

Further, linearity correction (mesh correction) will be described. Errors due to variation in accuracy of the galvanometers and distortions in the optical unit influence the working accuracy. The linearity correction is intended to correct nonlinear errors which cannot be corrected by either of the above distortion correction and orthogonality correction. The linearity correction is performed in such a manner that the amount of error is measured in advance at each of measurement points set in correspondence with meshes, as shown in FIG. 9. In this case, cross points of the meshes correspond to command points which are in advance set to detect the errors ΔX1 to ΔX4. After this, with respect to each command point during machining operation, the correction value on the X-axis is computed from amounts of error ΔX1 to ΔX4 at four points surrounding the command point and from designated position data a to d on the command point, as shown in FIG. 9. As shown in FIG. 10, the correction value ΔXp on the X-axis can be computed by the following equations:

$$\Delta X5=\Delta X1+(\Delta X2-\Delta X1)*a/(a+b)$$

$$\Delta X6=\Delta X3+(\Delta X4-\Delta X3)*a/(a+b)$$

$$\Delta Xp=\Delta X5+(\Delta X6-\Delta X5)*c/(c+d)$$

The correction value on the Y-axis is computed in the same way.

In the galvanometer controller 16 of this embodiment, the circuits for performing processing of various kinds including the processing for correcting a working distortion of a lens, the processing for correcting the orthogonality between the two axes, processing for correcting the linearity on each axis, and the PID control processing using the sensed position signals 13a and 13b as feedback signals, and the management table for storing and managing parameters for each correction processing are provided in the digital control unit 2, thereby making it possible to reduce changes in characteristics due to changes with time in the controller or factors in the operating environment and to thereby control the galvanometer deflectors with stability. Through control of the parameters for each processing from the host controller 1, operations for adjusting the galvanometer deflectors can be performed more easily and, further, an unskilled operator can easily perform the adjustment operations with reliability.

Figure 11:
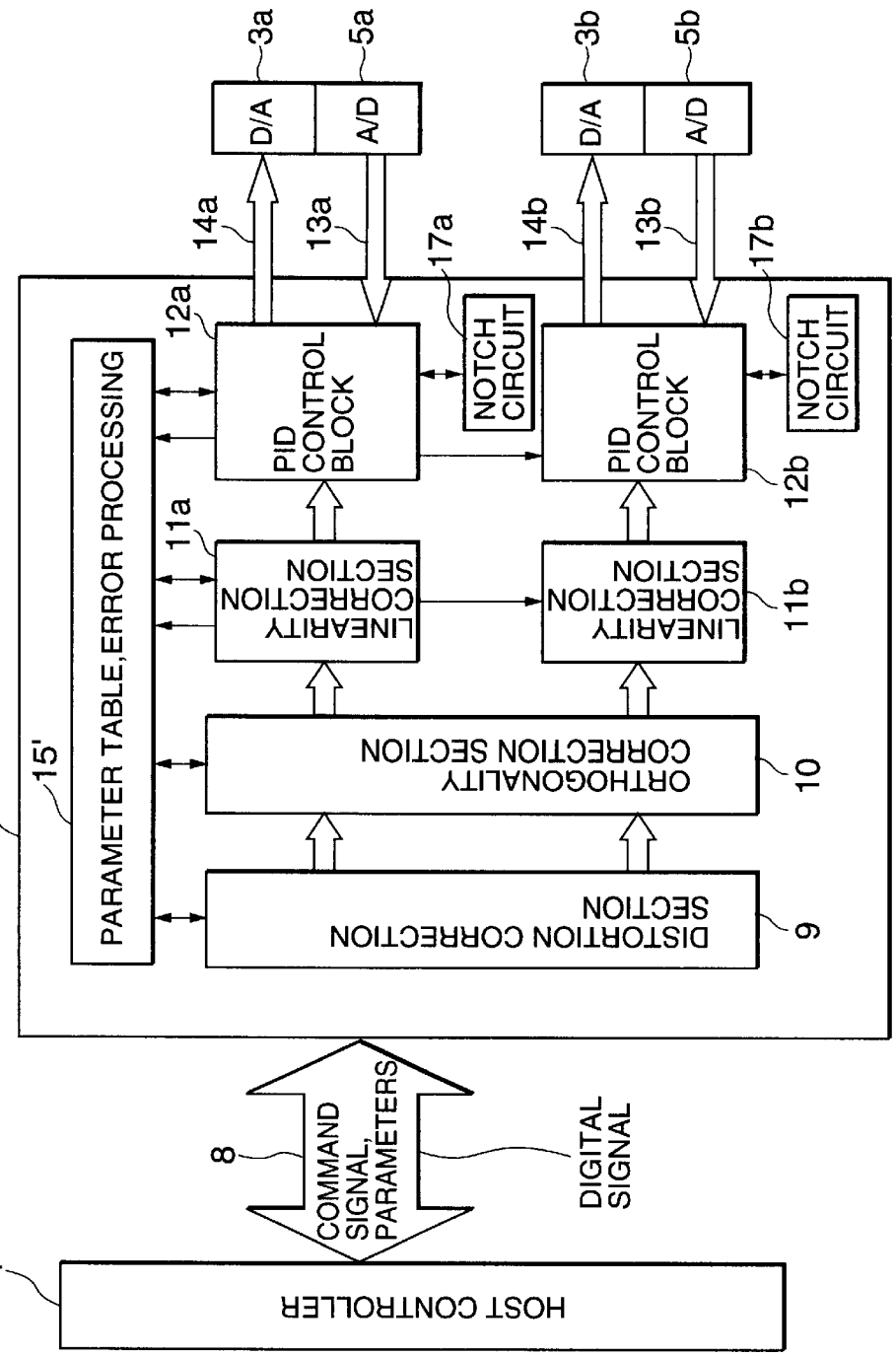
FIG. 11 is a block diagram schematically showing a galvanometer control unit according to a second embodiment of the present invention.
Figure 12:
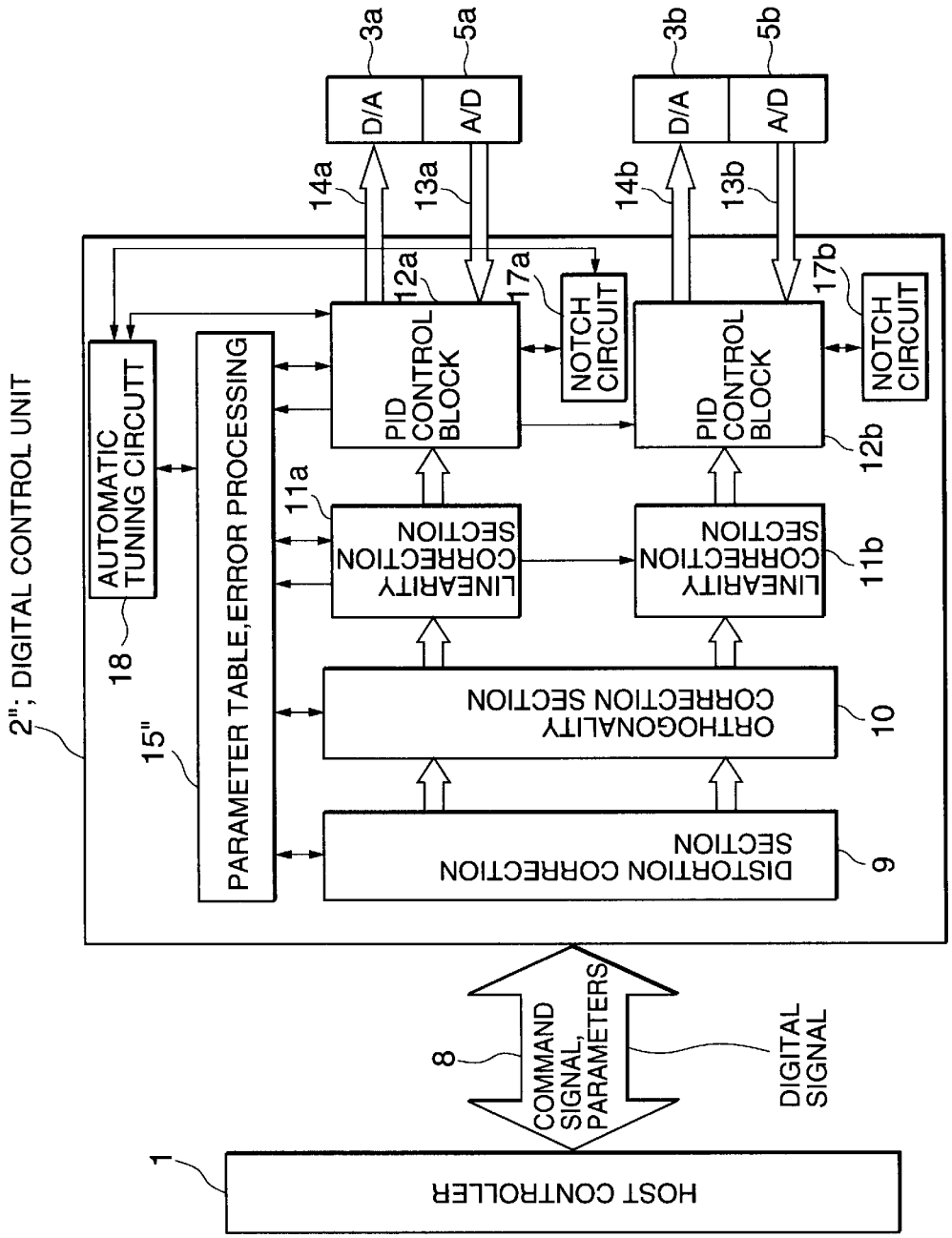
FIG. 12 is a block diagram schematically showing a galvanometer control unit according to a third embodiment of the present invention.

A galvanometer controller and a laser machining apparatus using the galvanometer controller of other embodiments of the present invention will next be described with reference to FIGS. 11 and 12. FIG. 11 shows a digital control unit 2' of a second embodiment, and FIG. 12 shows another configuration of the galvanometer controller of a third embodiment. The second embodiment is characterized by performing function of reducing the influence of resonance of galvanometer deflectors. The third embodiment is characterized by performing function of automatically optimizing parameters in addition to those according to the first embodiment. In other respects, these embodiments are the same as the first embodiment. Referring to FIG. 11, the digital control unit 2' further includes notch circuits 17a and 17b. Referring to FIG. 12, the digital control unit 2" further includes an automatic turning circuit 18. In general, a galvanometer deflector has a specific resonance frequency because of its structural characteristic. If the operating frequency of the galvanometer deflector is close to the resonance frequency, the galvanometer deflector resonates and vibration of a rotating shaft of the deflector occurs, thereby resulting in failure of accurate scanning with a laser beam. In the second embodiment, for the purpose of improving the accuracy of scanning, the notch circuits 17a and 17b are connected to the PID control blocks 12a and 12b to reduce resonating vibration of the galvanometer deflectors.

The automatic tuning circuit 18 obtains parameters from the parameter table 15 for storing and managing parameters for use in the correction processing and control processing, compares the parameters with values input in advance, performs computation using the parameters, and performs automatic control such that the parameters converge to optimum values.

As described above, the sections for the various kind corrections and the PID control blocks are incorporated in the digital unit, and additional circuits are provided in the unit 2, thereby enabling the galvanometer deflectors to be controlled with higher accuracy while achieving the same effect as that of the first embodiment.

Figure 13:
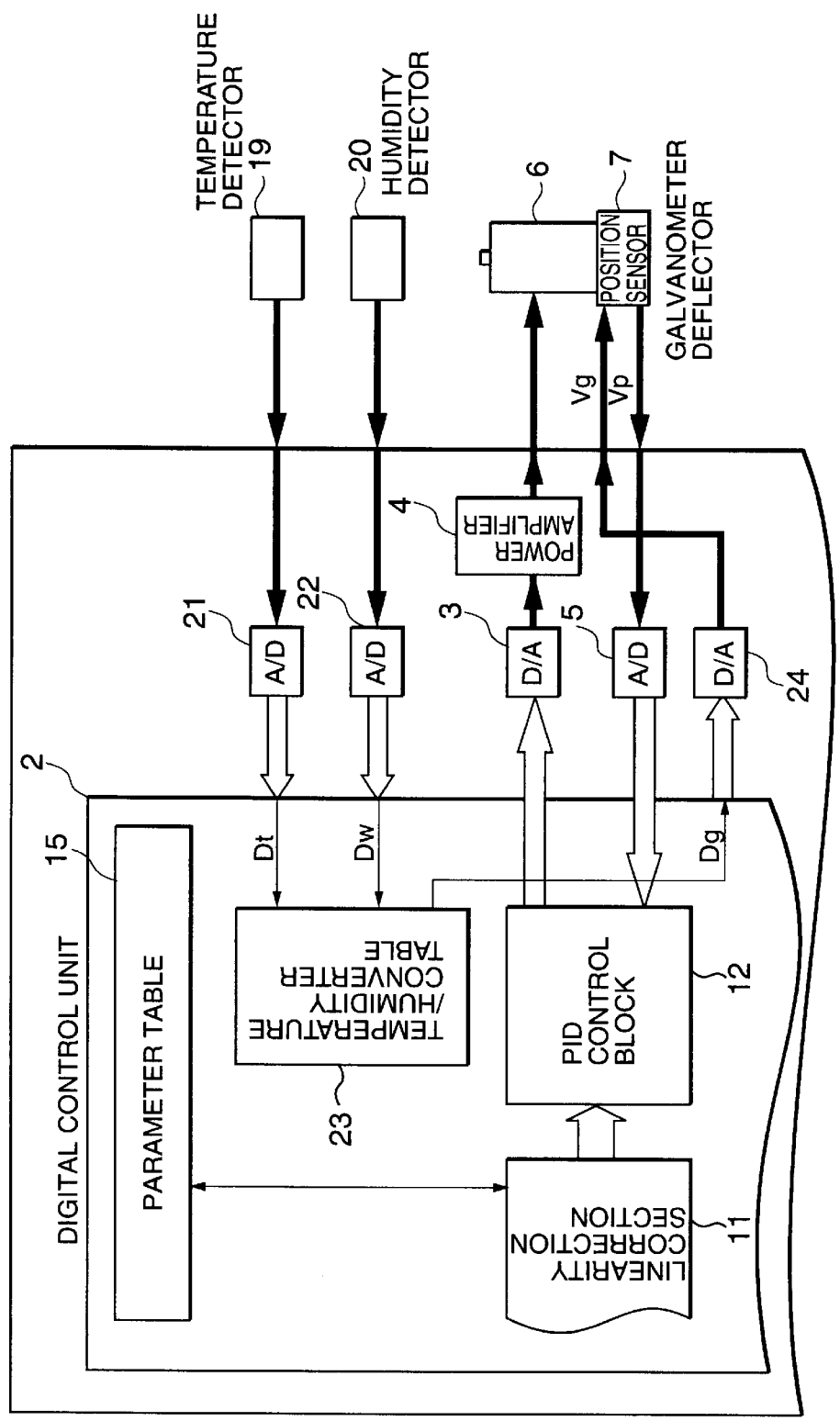
FIG. 13 is a block diagram schematically showing a galvanometer controller according to a fourth embodiment of the present invention.

According to the above embodiments, it is possible to prevent characteristic change in the galvanometer controller due to temperature change. However, it is still impossible to compensate characteristic change of a galvanometer itself. In general, a characteristic of a galvanometer varies due to the temperature change and humidity change and, therefore, the position sensed signal from the position sensor 7 becomes varied. A fourth embodiment shown in FIG. 13 is capable of compensating the characteristic changes of a galvanometer due to the temperature change and humidity change. In FIG. 13, there are provided a temperature detector 19, a humidity detector 20 and a temperature/humidity converter table 23. The temperature detected signal and humidity detected signal from the detectors 19 and 20 are supplied to the temperature/humidity converter table 23 through A/D converters 21 and 22, respectively. In the temperature/humidity converter table 23, a gain factor for the sensed position signal Vp produced in the position sensor 7 is predeterminedly stored. In this case, the position sensed error due to the temperature change and humidity change are previously measured in practice and after this, the gain factor for compensating the position sensed error is determined and stored in the table. Alternatively, if the gain factor can be expressed by a functional equation according to the temperature change and humidity change, it may be possible to make up the table 23 by apply at least one function table. Further, when extent of the position sensed error is varied according to the position of the galvanometer, the gain factor is determined according to the sensed position in addition to the temperature and humidity. The gain factor data Dg are outputted from the table 23 and applied the position sensor 7 through a D/A converter 24.

Figure 14:
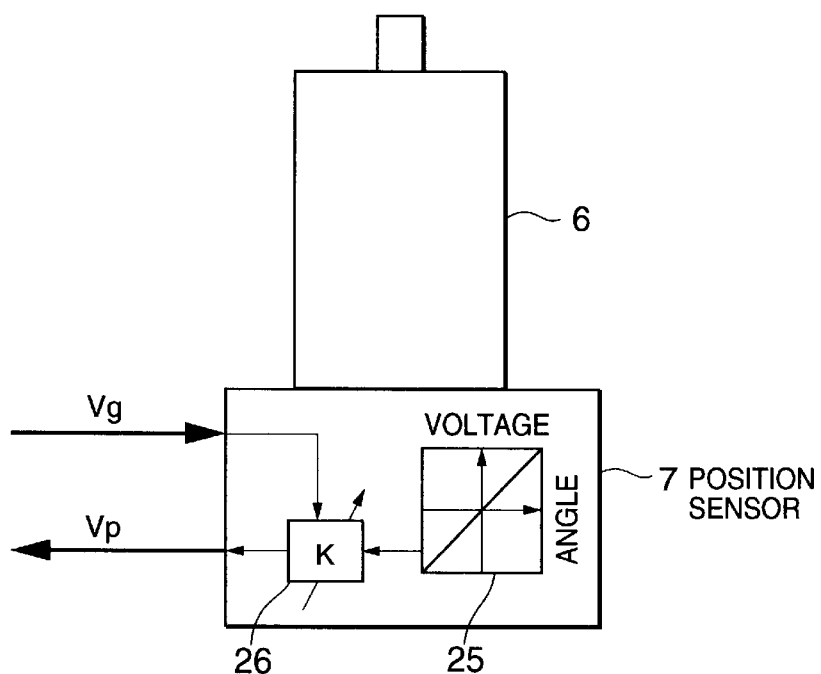
FIG. 14 shows a configuration of a position sensor in the fourth embodiment shown in FIG. 13.
Figure 15:
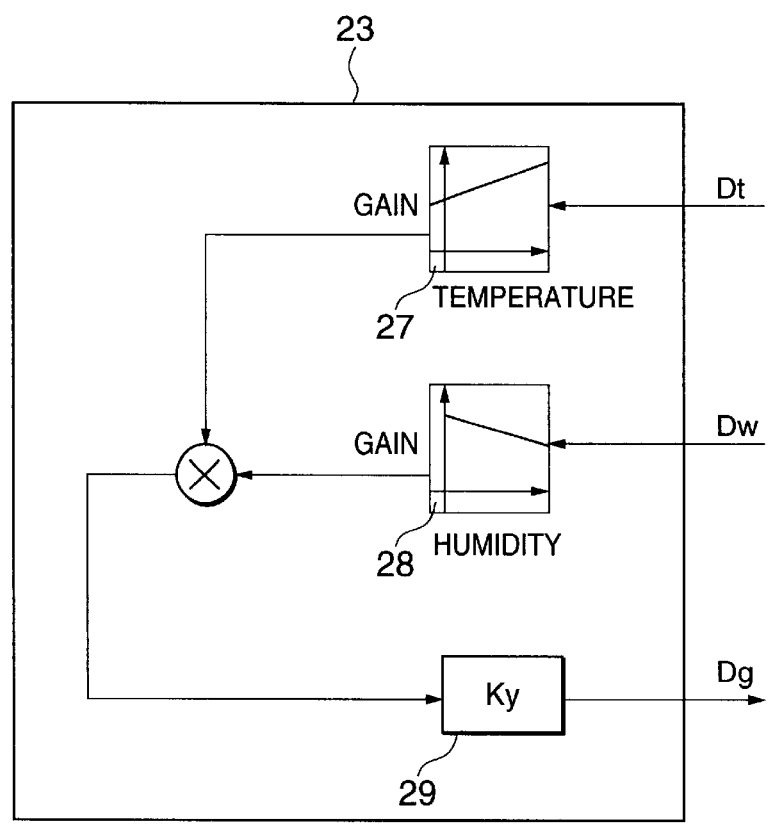
FIG. 15 schematically shows a configuration of a temperature/humidity converter table in the fourth embodiment shown in FIG. 13.

In FIG. 14 showing the position sensor 7, an initial position sensed signal level from an angle detector 25 is controlled in response to the gain factor signal Vg from the D/A converter 24. In FIG. 15 showing one example on the temperature/humidity converter table 23, the temperature data Dt and the humidity data Dw are converted in function tables 27 and 28 and the converted data are multiplied. Further, the multiplied data are corrected by an individual difference factor Ky depending on each galvanometer 6 in a correction circuit 29.

As described above, the galvanometer controller and the laser machining apparatus having the galvanometer controller have advantages described below.

First, since almost all the signal processings relating to control of the galvanometer deflectors are performed in a digital manner in the digital control unit, no changes due to changes with time in the circuit components occur in the state of adjustment.

Second, no changes occur due to variation in environment temperature for the same reason as the first advantage.

Third, the adjustment quality can be improved for the same reason as the third advantage.

Fourth, change of control software in the digital control unit suffices for enabling addition of a function. The facility with which functional expansion is performed is improved and a higher degree of functional expansion can also be performed.

Fifth, even if characteristics of a galvanometer itself inherently varies according to the temperature change and humidity change, erroneous operation can be also prevented.

What is claimed is:

1. A galvanometer controlling apparatus comprising:
a galvanometer for scanning a laser beam;
an optical unit receiving a scanned laser beam from the galvanometer to lead the scanned laser beam for a workpiece;
a position sensor for sensing a scanning position of the galvanometer to deliver a sensed signal;
processing means receiving a digital command signal from a an upstream stage and the sensed signal from the position sensor for processing the digital command signal with the sensed signal to deliver a digital driving signal for the galvanometer;
a D/A converter for converting the digital driving signal into an analog signal;
an amplifier for amplifying the analog signal and supplying an amplified analog signal to the galvanometer, wherein the processing means includes a correction circuit for correcting scanning performed by the galvanometer, and the correction circuit is formed in a digital circuit; and
a temperature detector to produce a temperature signal, wherein the correction circuit corrects an error due to characteristic change of the galvanometer depending on temperature change, in response to the temperature signal.

2. A galvanometer controlling apparatus according to claim 1, wherein the correction circuit corrects laser beam scanning caused by optical distortion contained in the optical unit.

3. A galvanometer controlling apparatus according to claim 1, wherein the galvanometer has a an arrangement for scanning the laser beam on two axes and the correction circuit corrects an error in orthogonality with respect to the two axes.

4. A galvanometer controlling apparatus according to claim 1, wherein the galvanometer has a arrangement for scanning the laser beam on two axes and the correction circuit corrects nonlinear errors due to variation in accuracy of the galvanometer.

5. A laser machining apparatus comprising:
a galvanometer for scanning a laser beam;
a table;
optical elements receiving a scanning laser beam from the galvanometer to lead the scanning laser beam for a workpiece on the table;
a position sensor for sensing a scanning position of the galvanometer to deliver a sensed signal;
a humidity detector for delivering a humidity signal;
processing means receiving command data with the sensed signal and the humidity signal to deliver driving data for the galvanometer;
a D/A converter for converting the driving data into an analog signal; and
an amplifier for amplifying the analog signal and supplying an amplified analog signal to the galvanometer, wherein the processing means includes a correction circuit, and the correction circuit is formed in a digital circuit.

6. A galvanometer controlling apparatus comprising:
a galvanometer for scanning a laser beam;
an optical unit receiving a scanned laser beam from the galvanometer to lead the scanned laser beam for a workpiece;
a position sensor for sensing a scanning position of the galvanometer to deliver a sensed signal;
processing means receiving a digital command signal from an upstream stage and the sensed signal from the position sensor for processing the digital command signal with the sensed signal to deliver a digital driving signal for the galvanometer;
a D/A converter for converting the digital driving signal into an analog signal;
an amplifier for amplifying the analog signal and supplying an amplified analog signal to the galvanometer, wherein the processing means includes a correction circuit for correcting scanning performed by the galvanometer, and the correction circuit is formed in a digital circuit; and
a humidity detector to produce a humidity signal, wherein the correction circuit corrects an error due to characteristic change of the galvanometer depending on humidity change, in response to the humidity signal.

7. A laser machining apparatus comprising:

a galvanometer for scanning a laser beam;

a table;

optical elements receiving a scanning laser beam from the galvanometer to lead the scanning laser beam for a workpiece on the table;

a position sensor for sensing a scanning position of the galvanometer to deliver a sensed signal;

a temperature detector for delivering a temperature signal;

processing means receiving command data with the sensed signal and the temperature signal to deliver driving data for the galvanometer;

a D/A converter for converting the driving data into an analog signal; and an amplifier for amplifying the analog signal and supplying an amplified analog signal to the galvanometer, wherein the processing means includes a correction circuit and the correction circuit is formed in a digital circuit.

* * * * *